United States Patent
Hong et al.

(10) Patent No.: US 10,584,682 B2
(45) Date of Patent: Mar. 10, 2020

(54) FLOATING-TYPE OFFSHORE WIND POWER GENERATION FACILITY

(71) Applicant: Korea Institute of Ocean Science Technology, Ansan-si, Gyeonggi-do (KR)

(72) Inventors: Key Yong Hong, Daejeon (KR); Kang Su Lee, Incheon (KR); Jong Su Choi, Daejeon (KR); Kyong Hwan Kim, Daejeon (KR); Se Wan Park, Daejeon (KR)

(73) Assignee: KOREA INSTITUTE OF OCEAN SCIENCE & TECHNOLOGY, Ansan-si (KR)

( * ) Notice: Subject to any disclaimer, the term of this patent is extended or adjusted under 35 U.S.C. 154(b) by 283 days.

(21) Appl. No.: 15/543,968

(22) PCT Filed: Apr. 30, 2015

(86) PCT No.: PCT/KR2015/004441
§ 371 (c)(1),
(2) Date: Jul. 14, 2017

(87) PCT Pub. No.: WO2016/085065
PCT Pub. Date: Jun. 2, 2016

(65) Prior Publication Data
US 2018/0045179 A1 Feb. 15, 2018

(30) Foreign Application Priority Data

Nov. 28, 2014 (KR) .................... 10-2014-0169010
Nov. 28, 2014 (KR) .................... 10-2014-0169013

(51) Int. Cl.
*F03D 1/06* (2006.01)
*F03D 13/25* (2016.01)
(Continued)

(52) U.S. Cl.
CPC .............. *F03D 13/25* (2016.05); *F03D 7/02* (2013.01); *F03D 7/0204* (2013.01);
(Continued)

(58) Field of Classification Search
CPC . F03D 1/02; F03D 7/02; F03D 7/0212; F03D 7/0296; F03D 9/30; F03D 9/34;
(Continued)

(56) References Cited

U.S. PATENT DOCUMENTS 4,630,996 A * 12/1986 Masaki .................. F03D 80/70
416/16
8,449,257 B2 * 5/2013 Lavaur .................... F03D 13/20
416/142
(Continued)

FOREIGN PATENT DOCUMENTS

KR        20-0285677 Y1    8/2002
KR    10-2010-0019287 A    2/2010
(Continued)

*Primary Examiner* — Ninh H. Nguyen
(74) *Attorney, Agent, or Firm* — Novick, Kim & Lee, PLLC; Sang Ho Lee (57) ABSTRACT

A floating type offshore wind power generation facility includes: a wind power generation unit which is installed to be horizontally rotatable about a vertical rotation center while being placed in an inclined state on an offshore structure or installed to be rotatable in two directions about a horizontal rotation center of the offshore structure, and converts rotational kinetic energy of blades caused by sea wind into electrical energy; and a driving unit which is connected to a lower end of the wind power generation unit in a state in which the driving unit is installed on the offshore structure, and changes a pivoting angle or a rotating angle of the wind power generation unit by generating driving power.

7 Claims, 6 Drawing Sheets

(51) Int. Cl.
  *F03D 15/10* (2016.01)
  *F03D 9/30* (2016.01)
  *F03D 7/02* (2006.01)
  *F03D 9/34* (2016.01)

(52) U.S. Cl.
  CPC ............. *F03D 7/0212* (2013.01); *F03D 9/30* (2016.05); *F03D 9/34* (2016.05); *F03D 15/10* (2016.05); *F05B 2240/93* (2013.01); *F05B 2240/95* (2013.01); *F05B 2240/96* (2013.01); *F05B 2250/312* (2013.01); *F05B 2250/42* (2013.01); *F05B 2270/20* (2013.01); *F05B 2270/602* (2013.01); *Y02E 10/727* (2013.01)

(58) Field of Classification Search
  CPC .............. F05B 2240/95; F05B 2240/93; F05B 2240/96; F05B 2250/312; F05B 2250/42
  See application file for complete search history.

(56) References Cited

U.S. PATENT DOCUMENTS

| | | | |
|---|---|---|---|
| 9,909,569 B2* | 3/2018 | Hammerum | F03D 7/0224 |
| 2010/0270809 A1 | 10/2010 | Dahlhaug | |
| 2012/0171034 A1* | 7/2012 | Gabeiras | F03D 7/0204 |
| | | | 416/1 |
| 2013/0302139 A1* | 11/2013 | Wittrisch | F03D 7/0204 |
| | | | 415/14 |
| 2015/0147174 A1* | 5/2015 | Couchman | F03D 7/047 |
| | | | 416/1 |

FOREIGN PATENT DOCUMENTS

| KR | 10-0960706 B1 | 5/2010 |
|---|---|---|
| KR | 10-2012-0002184 A | 1/2012 |
| KR | 10-2013-0084868 A | 7/2013 |

\* cited by examiner

FLOATING-TYPE OFFSHORE WIND POWER GENERATION FACILITY

TECHNICAL FIELD

The present invention relates to a floating type offshore wind power generation facility, in which forward and rearward angles of blades are selectively changed and an installation position of a tower is selectively changed by a pivoting operation, thereby minimizing an influence of a wake between wind power generation units, and preventing deterioration in wind power generation performance and structural safety.

BACKGROUND ART

In general, an offshore wind power generation facility generates electricity by rotating rotor blades installed at a predetermined height from the ground. The offshore wind power generation facility uses kinetic energy of wind. The offshore wind power generation facility operates an electric generator installed in a wind power generator by using mechanical energy generated by the rotation of the rotor blades.

Because the offshore wind power generation facility does not have a risk of environmental pollution and has a great potential ability as an energy resource, the offshore wind power generation facility has been widely developed and used in many countries as an alternative energy source.

However, if a set of blades of the offshore wind power generation facility is installed to be adjacent to one another, fatigue loads can be applied to adjacent towers or adjacent blades due to an influence of wakes between the offshore wind power generation facilities.

In this case, the wake of the offshore wind power generation facility affects the rotation of the adjacent blades disposed at a rear side, thereby degrading wind power generation performance, and increasing turbulence intensity and fatigue loads, which causes deterioration in structural safety of equipment.

Therefore, there is a need for a technology capable of minimizing an influence of wakes between the set of blades installed adjacent to one another, and ensuring structural stability of the tower.

As a document in the related art associated with the present invention, there is Korean Patent Application Laid-Open No. 10-2013-0084868 (Jul. 26, 2013) that discloses a floating type wind power generation apparatus.

DISCLOSURE

Technical Problem

An object of the present invention is to provide a floating type offshore wind power generation facility in which forward and rearward angles of blades are selectively changed and an installation position of a tower is selectively adjusted by a pivoting operation, thereby minimizing an influence of a wake between wind power generation units, and thus preventing deterioration in wind power generation performance and structural safety.

Technical Solution

A floating type offshore wind power generation facility according to the present invention includes: a wind power generation unit which is installed to be horizontally rotatable about a vertical rotation center while being placed in an inclined state on an offshore structure or installed to be rotatable in two directions about a horizontal rotation center of the offshore structure, and converts rotational kinetic energy of blades caused by sea wind into electrical energy; and a driving unit which is connected to a lower end of the wind power generation unit in a state in which the driving unit is installed on the offshore structure, and changes a pivoting angle or a rotating angle of the wind power generation unit by generating driving power.

The wind power generation unit may be installed to be horizontally rotatable at 360°.

The wind power generation unit may be rotated within a range of 180°.

A plurality of wind power generation units may be disposed to be spaced apart from one another on the offshore structure, and the driving unit may selectively pivot and position the wind power generation units at an angle that avoids wakes created at a rear side of the blade.

A control unit for controlling an electrical operation may be further electrically connected to the driving unit, and the control unit may change a pivoting angle or a rotating angle of the wind power generation unit by using an operation signal of the driving unit.

The driving unit may include a power transmission member and a rotary motor. The power transmission member is coupled to the lower end of the wind power electric generation unit so as to be horizontally rotatable. The rotary motor is installed on the offshore structure and operated by electric power transmitted from the outside to horizontally rotate the power transmission member.

The power transmission member may include: a driven gear which is installed at the lower end of the wind power generation unit so as to be horizontally rotatable; and a driving gear which is coupled to a driving shaft of the drive motor so as to be horizontally rotatable, and engaged with the driven gear so as to rotate the driven gear.

The driving unit may include a rotary motor which has a driving shaft that is horizontally connected to the lower end of the wind power generation unit and transmits rotational force.

The wind power generation unit may be installed to be horizontally movable along an upper end of the offshore structure, and the floating type offshore wind power generation facility may further include an auxiliary driving unit. The auxiliary driving unit is operated by electric power transmitted from the outside to horizontally move the wind power generation unit.

The auxiliary driving unit may include: a rail which is horizontally installed on the upper end of the offshore structure so as to define a movement route, in which the lower end of the wind power generation unit is slidably installed on an upper end of the rail; and a moving motor which is connected to the lower end of the wind power generation unit and operated by electric power transmitted from the outside to slide the wind power generation unit along the movement route.

A screw, which is horizontally and penetratively coupled to the lower end of the wind power generation unit and has a length along the movement route, may be further connected to a driving shaft of the moving motor, and the screw may horizontally rotate to move the wind power generation unit along the movement route.

Advantageous Effects

According to the present invention, an influence of the wake between the blades may be minimized. and as a result, it is possible to prevent deterioration in wind power generation performance. Furthermore, turbulence intensity and fatigue loads may be reduced, and as a result, it is possible to prevent deterioration in structural safety.

In addition, the power generation equipment and the blades may be placed outside the offshore structure, and as a result, it is possible to ensure an installation space for the equipment.

BEST MODE

Hereinafter, exemplary embodiments of the present invention will be described in detail with reference to the accompanying drawings.

Figure 1:
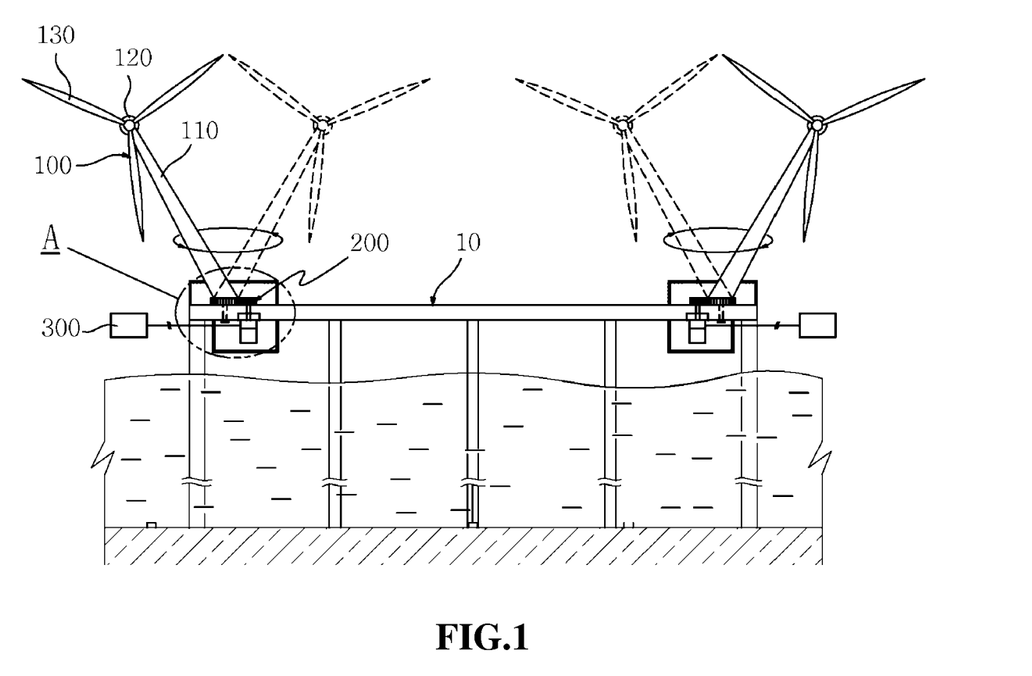
FIG. 1 is a front view illustrating a floating type offshore wind power generation facility according to a first exemplary embodiment of the present invention.
Figure 2:
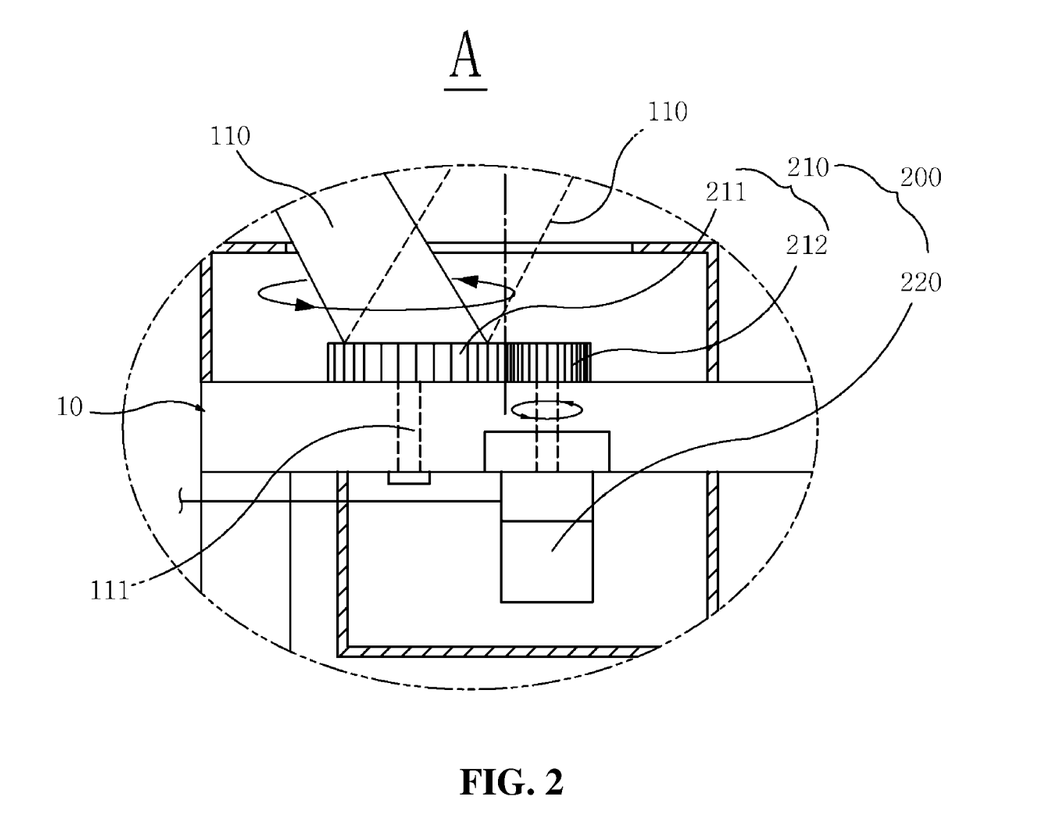
FIG. 2 is a top plan view illustrating the floating type offshore wind power generation facility according to the first exemplary embodiment of the present invention.
Figure 3:
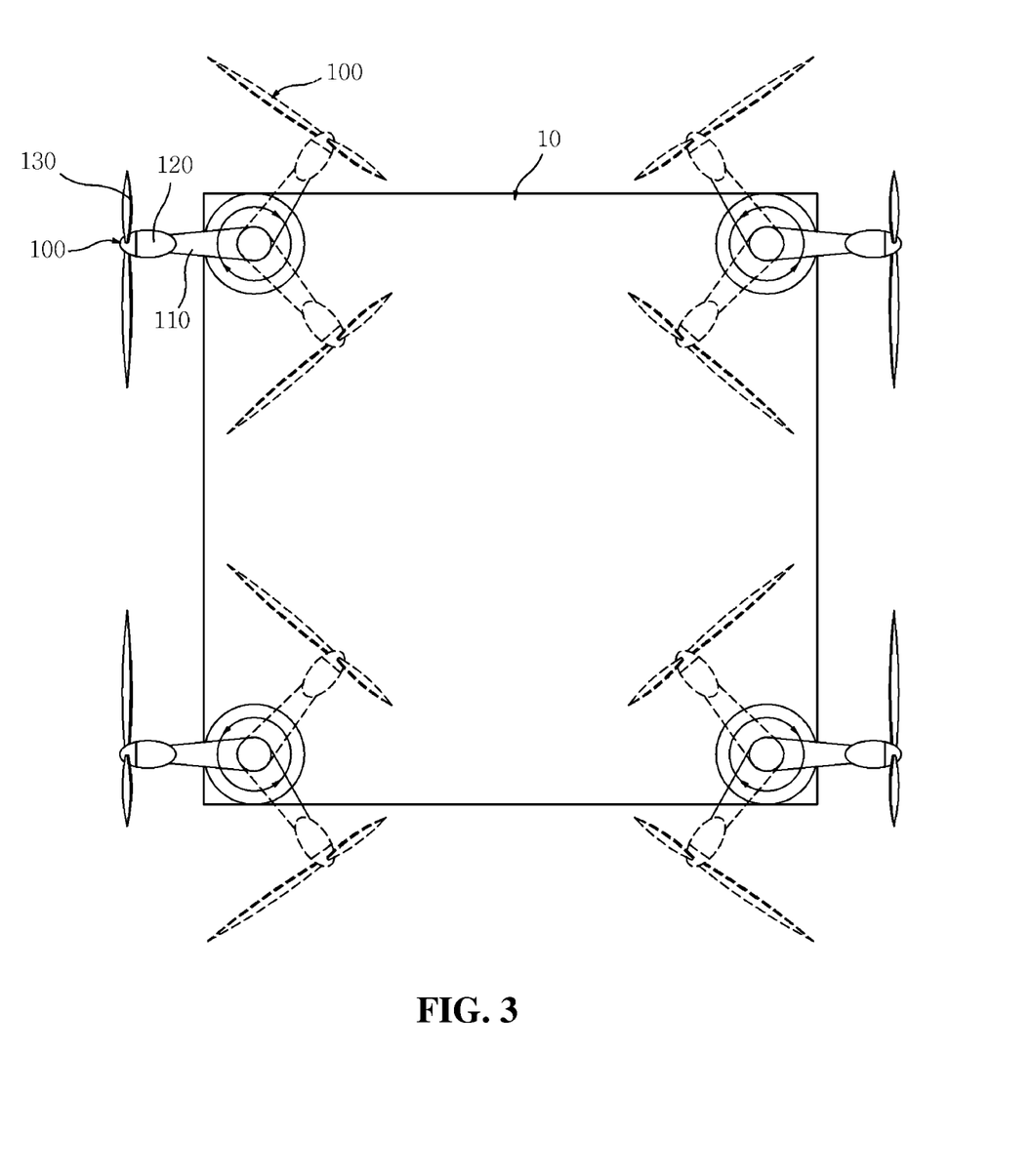
FIG. 3 is a cross-sectional view detailedly illustrating an operational structure of the floating type offshore wind power generation facility according to the first exemplary embodiment of the present invention.

FIG. 1 is a front view illustrating a floating type offshore wind power generation facility according to a first exemplary embodiment of the present invention, FIG. 2 is a top plan view illustrating the floating type offshore wind power generation facility according to the first exemplary embodiment of the present invention, and FIG. 3 is a cross-sectional view detailedly illustrating an operational structure of the floating type offshore wind power generation facility according to the first exemplary embodiment of the present invention.

Referring to FIGS. 1 to 3, a floating type offshore wind power generation facility according to a first exemplary embodiment of the present invention includes a wind power generation unit 100 installed on an offshore structure 10, and a driving unit 200.

First, the offshore structure 10 may be placed to be equal to or higher than a seawater level 10, and a plurality of support members may be installed at a lower end of the offshore structure 10 so that the offshore structure 10 may be fixedly placed on a seabed.

As illustrated in FIG. 3, the offshore structure 10 may have a quadrangular frame shape, but the offshore structure 10 may be manufactured to have various shapes as necessary.

One or more wind power generation units 100 are installed along an upper end of the offshore structure 10 and produce electric power by using offshore wind power.

Here, the wind power generation unit 100 is installed on the upper end of the offshore structure 10 so as to be inclined in one direction.

In this state, the wind power generation unit 100 is installed on the upper end of the offshore structure 10 so as to be horizontally rotatable about a vertical rotation center.

Further, the wind power generation unit 100 converts rotational kinetic energy of the blade 130, which is generated by sea wind, into electrical energy.

To this end, the wind power generation unit 100 includes a tower 110, a housing 120, blades 130, a gear unit (not illustrated), and an electric generator (not illustrated).

As illustrated in FIG. 1, the tower 110 has a predetermined vertical length, and the tower 110 may extend in a state of being inclined at a predetermined angle from the upper end of the offshore structure 10.

Here, as illustrated in FIG. 1, the tower 110 may have a rotating shaft 111 formed vertically at a lower end of the tower 110, and the rotating shaft 111 may be installed on the upper end of the offshore structure 10 so as to be horizontally rotatable.

Further, the tower 110 may be shaped such that a diameter of the tower 110 is gradually decreased to an upper end of the tower 110 from the lower end coupled to the upper end of the offshore structure 10.

Figure 4:
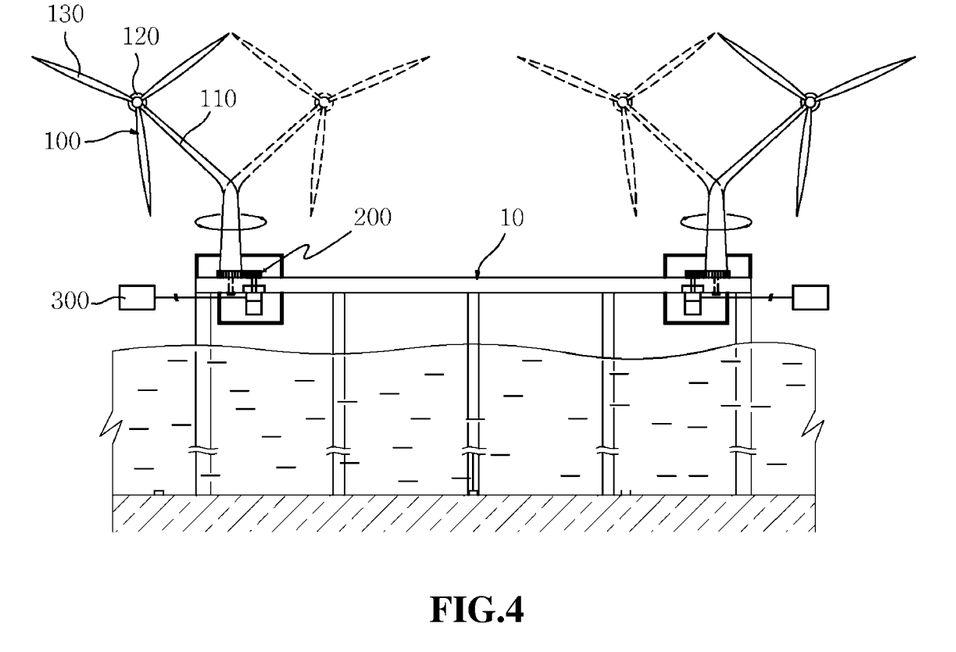
FIG. 4 is a front view illustrating a floating type offshore wind power generation facility according to a second exemplary embodiment of the present invention.

Meanwhile, as illustrated in FIG. 4, the tower 110 may be extended vertically from the upper end of the offshore structure 10 and then be inclined at a predetermined angle.

In addition, the housing 120 may be installed on the upper end of the tower 110, and the electric generator (not illustrated), the power transmission gear unit (not illustrated), and the like are disposed in the housing 120.

The blades 130 are rotatably installed at a front end of the housing 120, and the electric generator receives kinetic energy generated by the rotation of the blades 130 and produces electrical energy.

The wind power generation unit 100 may use a method of generating induced current by using a stator having a coil installed therein and a rotor having a magnetic material.

For example, the wind power generation units 100 may be disposed at corner portions of the offshore structure at predetermined intervals.

As illustrated in FIG. 2, the tower 110 may be installed to be horizontally rotatable at 360° based on the rotating shaft 111 vertically formed at the lower end of the tower 110.

Further, a separate angle adjusting unit (not illustrated) for adjusting angles of the blades 130 may be further installed in the housing 120 of the wind power generation unit 100.

The wind power generation unit 100 is pivoted by a desired angle by driving power of the driving unit 200 to be described below, and as a result, the angles of the blades 130 in a front and rear direction may be adjusted.

The driving unit 200 is connected to a lower end of the wind power generation unit 100 in a state in which the driving unit 200 is installed on an upper portion of the offshore structure 10.

Further, the driving unit 200 changes a pivoting angle of the wind power generation unit 100 by generating driving power.

Therefore, the driving unit 200 may selectively pivot and position the wind power generation units 100 at an angle that avoids wakes created at a rear side of the blade 130.

To this end, as illustrated in FIG. 2, the driving unit 200 may include a power transmission member 210 and a rotary motor 220.

The power transmission member 210 may be coupled to the lower end of the wind power generation unit 100 so as to be horizontally rotatable in order to transmit driving power of the rotary motor 220 to the lower end of the tower 110.

Here, the power transmission member 210 may include a driven gear 211 and a driving gear 212.

The driven gear 211 may be installed at the lower end of the wind power generation unit 100 so as to be horizontally rotatable integrally, and a plurality of teeth may be formed along a lateral side that defines a circumference of the driven gear 211.

The driving gear 212 may be coupled to a driving shaft of the rotary motor 220, which will be described below, so as to be horizontally rotatable, and a plurality of teeth may be formed along a lateral side that defines a circumference of the driving gear 212.

The driving gear 212 is engaged with the driven gear 211, and rotates the driven gear 211 while being rotated by transmission of rotational force of the rotary motor 220 to be described below.

The rotary motor 220 is installed on the offshore structure 10 and operated by electric power transmitted from the outside to horizontally rotate the driving gear 212.

Here, the driving shaft of the rotary motor 220 may be vertically installed on the upper end of the offshore structure 10 so that the driving shaft of the rotary motor 220 is directed in an up and down direction.

Further, the driving gear 212 is coupled to the driving shaft of the rotary motor 220 so as to be horizontally rotatable.

In addition, a control unit 300 for controlling an electrical operation may be further electrically connected to the rotary motor 220 of the driving unit 200.

The control unit 300 may change the pivoting angle of the wind power generation unit 100 by using an operation signal of the drive motor 220.

In addition, the control unit 300 may be electrically connected to the driving unit 200 with wireless communication in order to control the driving unit 200 at a remote place.

The control unit 300 may change the forward and rearward positions of the blades 130 installed on the wind power generation units 100, thereby enabling the adjacent blades 130 not to be affected by the wake.

Figure 5:
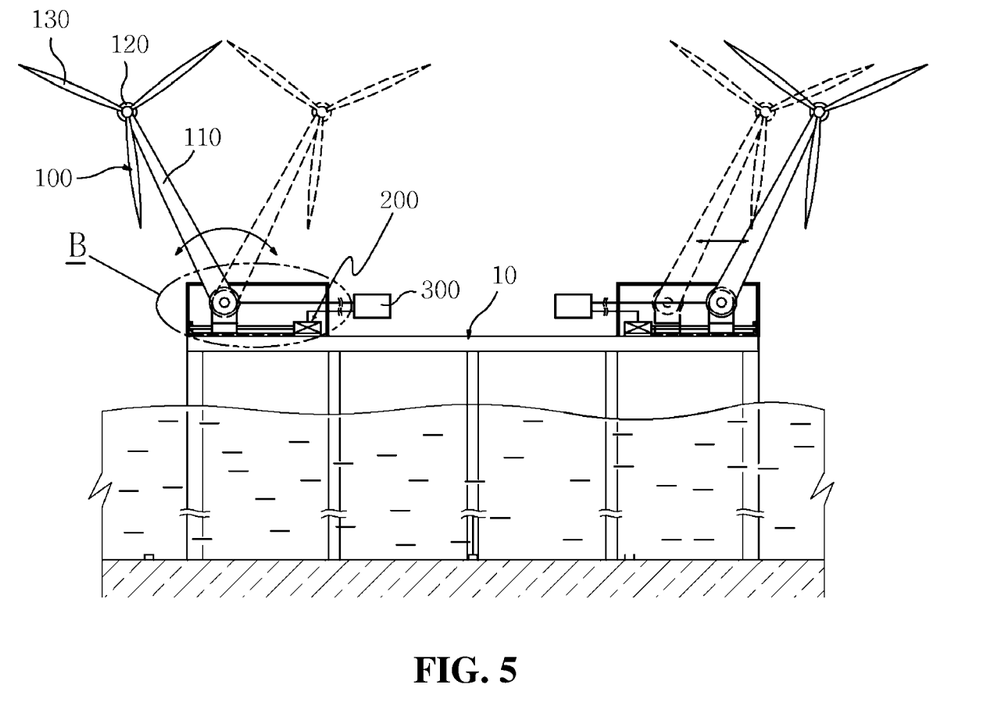
FIG. 5 is a top plan view illustrating the floating type offshore wind power generation facility according to the second exemplary embodiment of the present invention.
Figure 6:
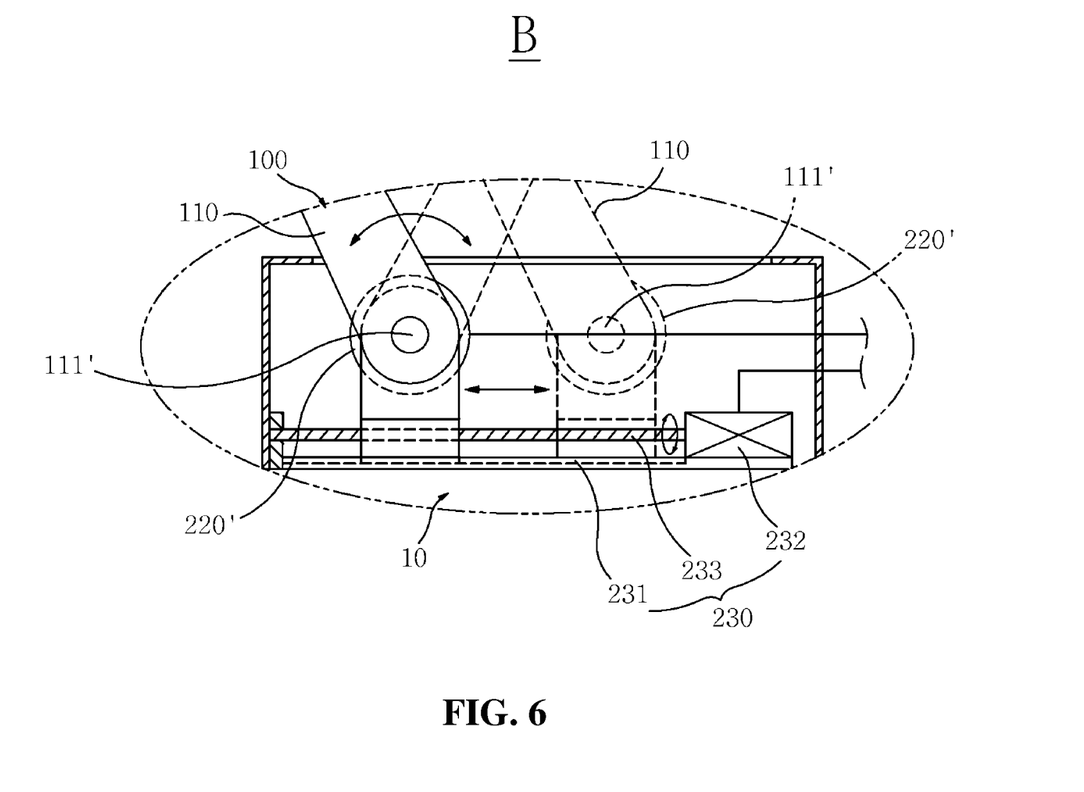
FIG. 6 is a cross-sectional view detailedly illustrating an operational structure of the floating type offshore wind power generation facility according to the second exemplary embodiment of the present invention.

Hereinafter, a floating type offshore wind power generation facility according to a second exemplary embodiment of the present invention will be described below.

Referring to FIGS. 4 to 6, a floating type offshore wind power generation facility according to a second exemplary embodiment of the present invention includes a wind power generation unit 100 installed on an offshore structure 10, and a driving unit 200.

First, one or more wind power generation units 100 are installed along an upper end of the offshore structure 10 and produce electric power by converting kinetic energy caused by wind power into electrical energy.

Here, the wind power generation unit 100 is installed on the upper end of the offshore structure 10 so as to be inclined in one direction.

In this state, the wind power generation unit 100 is installed on the upper end of the offshore structure 10 so as to be horizontally rotatable about a vertical rotation center.

To this end, the wind power generation unit 100 includes a tower 110, a housing 120, blades 130, a gear unit (not illustrated), and an electric generation unit (not illustrated).

As illustrated in FIG. 5, the tower 110 has a predetermined vertical length, and the tower 110 may extend in a state of being inclined at a predetermined angle from the upper end of the offshore structure 10.

Here, as illustrated in FIG. 1, the tower 110 may have a rotating shaft 111 formed vertically at a lower end of the tower 110, and the rotating shaft 111 may be installed on the upper end of the offshore structure 10 so as to be horizontally rotatable.

Further, as illustrated in FIG. 1, the tower 110 has a rotating shaft 111' formed vertically at a lower end of the tower 111, and the rotating shaft 111' may be installed on an upper portion of the offshore structure 10 so as to be horizontally rotatable.

In addition, the tower 110 may be shaped such that a diameter of the tower 110 is gradually decreased to an upper end of the tower 110 from the lower end coupled to the upper end of the offshore structure 10.

As illustrated in FIG. 3, the tower 110 is installed to be rotatable in two directions, and for example, the tower 110 may be rotated within a range of 180°.

Further, the housing 120 may be installed on the upper end of the tower 110, and the electric generator (not illustrated), the power transmission gear unit (not illustrated), and the like are disposed in the housing 120.

The blades 130 are rotatably installed at a front end of the housing 120, and the electric generator receives kinetic energy generated by the rotation of the blades 130 and produces electrical energy.

The wind power generation unit 100 may use a method of generating induced current by using a stator having a coil installed therein and a rotor having a magnetic material.

For example, as illustrated in FIG. 3, the offshore structure 10 may have a quadrangular frame shape, and the wind power generation units 100 may be disposed at corner portions of the offshore structure at predetermined intervals.

Further, a separate angle adjusting unit (not illustrated) for adjusting angles of the blades 130 may be installed in the housing 120 of the wind power generation unit 100.

The wind power generation unit 100 is rotated and placed by a desired angle by driving power of the driving unit 200 to be described below, and as a result, the directions of the blades 130 may be adjusted.

The driving unit 200 is connected to a lower end of the wind power generation unit 100 in a state in which the driving unit 200 is installed on the offshore structure 10.

In this case, the driving unit 200 changes a rotating angle of the wind power generation unit 100 by generating driving power.

The driving unit 200 may be a rotary motor 220' of which the driving shaft is horizontally connected to the lower end of the wind power generation unit 100 and transmits rotational force.

Meanwhile, the wind power generation unit 100 may be installed to be horizontally movable along the upper end of the offshore structure 10.

In addition, an auxiliary driving unit 230, which is operated by electric power transmitted from the outside to horizontally move the wind power generation unit 100, may be further provided on the offshore structure 10.

To this end, the auxiliary driving unit 230 includes a rail 231, a moving motor 232, and a screw 233.

First, the rail 231 is horizontally installed on the upper end of the offshore structure 10 and defines a movement route.

Further, the lower end of the tower 110 is slidably coupled to an upper end of the rail 231.

The moving motor 232 is connected to the lower end of the wind power generation unit 100 and operated by electric power transmitted from the outside to slide the wind power generation unit 100 along the movement route.

The screw 233 is horizontally installed on the rail 231 in a state in which a longitudinal end of the screw 233 is connected to a driving shaft of the moving motor 232.

Here, the screw 233 moves the tower 110 in an axial direction while rotating about a horizontal rotation center.

In addition, a control unit 300 for controlling an electrical operation may be further electrically connected to the rotary motor 220' of the driving unit 200 and the moving motor 232 of the auxiliary driving unit 230.

The control unit 300 may change the pivoting angle and the position of the wind power generation unit 100 by using operation signals of the drive motor 220 and the moving motor 232.

In addition, the control unit 300 may be electrically connected to the driving unit 200 with wireless communication in order to control the driving unit 200 at a remote place.

Consequently, according to the present invention, the forward and rearward angles of the blades 130 may be selectively changed by a pivoting operation, and the installation position of the tower 110 may be selectively adjusted.

Therefore, an influence of the wake between the wind power generation units 100 may be minimized, and as a result, it is possible to prevent deterioration in wind power generation performance. Further, turbulence intensity and fatigue loads may be reduced, and as a result, it is possible to prevent deterioration in structural safety.

In addition, the power generation equipment and the blades 130 may be placed outside the offshore structure 10, and as a result, it is possible to easily ensure an installation space.

While the specific exemplary embodiments related with the floating type offshore wind power generation facility according to the present invention have been described above, the exemplary embodiments may be modified to various exemplary embodiments without departing from the scope of the present invention.

Therefore, the scope of the present invention should not be limited to the described exemplary embodiment, but should be defined by the appended claims and the equivalents of the claims.

Accordingly, it should be understood that the aforementioned exemplary embodiment is described for illustration in all aspects and is not limited, and the scope of the present invention shall be represented by the claims to be described below, instead of the detailed description, and it should be construed that all of the changes or modified forms induced from the meaning and the scope of the claims, and an equivalent concept thereto are included in the scope of the present invention.

The invention claimed is:

1. A floating type offshore wind power generation facility comprising:
   a wind power generation unit which is installed to be rotatable in two directions about a horizontal rotation center of the offshore structure, and converts rotational kinetic energy of blades caused by sea wind into electrical energy; and
   a driving unit which is connected to a lower end of the wind power generation unit in a state in which the driving unit is installed on the offshore structure, and changes a pivoting angle or a rotating angle of the wind power generation unit by generating driving power,
   wherein a plurality of wind power generation units is disposed to be spaced apart from one another on the offshore structure, and the driving unit selectively pivots and positions the wind power generation units at an angle to avoid wakes created at a rear side of the blades of adjacent power generation units.

2. The floating type offshore wind power generation facility of claim 1, wherein the wind power generation unit is rotated within a range of 180°.

3. The floating type offshore wind power generation facility of claim 1, wherein a control unit for controlling an electrical operation is further electrically connected to the driving unit, and the control unit changes a pivoting angle or a rotating angle of the wind power generation unit by using an operation signal of the driving unit.

4. The floating type offshore wind power generation facility of claim 1, wherein the driving unit includes a rotary motor which has a driving shaft that is horizontally connected to the lower end of the wind power generation unit and transmits rotational force.

5. The floating type offshore wind power generation facility of claim 1, wherein the wind power generation unit is installed to be horizontally movable along an upper end of the offshore structure, and the floating type offshore wind power generation facility further includes an auxiliary driving unit which is operated by electric power transmitted from the outside to horizontally move the wind power generation unit.

6. The floating type offshore wind power generation facility of claim 5, wherein the auxiliary driving unit includes:
   a rail which is horizontally installed on the upper end of the offshore structure so as to define a movement route, in which the lower end of the wind power generation unit is slidably installed on an upper end of the rail; and
   a moving motor which is connected to the lower end of the wind power generation unit, and operated by electric power transmitted from the outside to slide the wind power generation unit along the movement route.

7. The floating type offshore wind power generation facility of claim 6, wherein a screw, which is horizontally and penetratively coupled to the lower end of the wind power generation unit and has a length along the movement route, is further connected to a driving shaft of the moving motor, and the screw rotates to move the wind power generation unit along the movement route.

* * * * *